(12) United States Patent
Wanner et al.

(10) Patent No.: US 10,646,967 B2
(45) Date of Patent: May 12, 2020

(54) WELDING ASSEMBLY FOR PERMANENT JOINING OF A FIRST TUBULAR COMPONENT WITH A SECOND COMPONENT

(71) Applicants: Fraunhofer-Gesellschaft zur Foerderung der angewandten Forschung e.V., Munich (DE); Universitaet Rostock, Rostock (DE)

(72) Inventors: Martin Christoph Wanner, Nienhagen (DE); Steffen Dryba, Kritzmow (DE); Bjoern Weidemann, Hamburg (DE); André Harmel, Rostock (DE)

(73) Assignees: Fraunhofer-Gesellschaft zur Foerderung der angewandten Forschung e.V., Munich (DE); Universität Rostock, Rostock (DE)

( * ) Notice: Subject to any disclaimer, the term of this patent is extended or adjusted under 35 U.S.C. 154(b) by 358 days.

(21) Appl. No.: 15/563,904

(22) PCT Filed: Mar. 16, 2016

(86) PCT No.: PCT/EP2016/055623
§ 371 (c)(1),
(2) Date: Oct. 2, 2017

(87) PCT Pub. No.: WO2016/156039
PCT Pub. Date: Oct. 6, 2016

(65) Prior Publication Data
US 2018/0117717 A1 May 3, 2018

(30) Foreign Application Priority Data
Apr. 2, 2015 (DE) .......................... 10 2015 206 044

(51) Int. Cl.
*B23K 10/00* (2006.01)
*B23K 37/02* (2006.01)
(Continued)

(52) U.S. Cl.
CPC .......... *B23K 37/0276* (2013.01); *B23K 9/032* (2013.01); *B23K 9/173* (2013.01);
(Continued)

(58) Field of Classification Search
CPC ............ B23K 37/0241; B23K 37/0276; B23K 37/0252; B23K 37/0282; B23K 9/032;
(Continued)

(56) References Cited

U.S. PATENT DOCUMENTS

| 4,659,903 A | 4/1987 | Berne et al. |
| 5,515,589 A | 5/1996 | Kazirskis et al. |

(Continued)

FOREIGN PATENT DOCUMENTS

| DE | 3005153 A1 | 8/1981 |
| DE | 3313230 A1 | 10/1984 |

(Continued)

OTHER PUBLICATIONS

International Search Report for PCT/EP2016/055623 dated Jun. 28, 2016; English translation submitted herewith (7 pages).

*Primary Examiner* — Mark H Paschall
(74) *Attorney, Agent, or Firm* — Fitch, Even, Tabin & Flannery LLP

(57) ABSTRACT

The invention relates to a welding assembly for the permanent joining of a first tubular component with a second component along a two- or three-dimensional intersection curve, along which both components contact, comprising a securing assembly for detachably securely joining on a tubular end of the first component facing away from the intersection curve, a manipulator unit mounted directly or (Continued)

indirectly on the securing assembly such that it can pivot about a tube longitudinal axis assigned to the first component. The manipulator unit has a freely positionable manipulator end, with a welding tool attached to the freely positionable manipulator end. The securing assembly comprises a clamping module that can at least partially be introduced into the tubular end of the first component on the end side and in an axial manner. The clamping module is detachably securely to a tube inner wall of the first tubular component, as well as a carrier ring module which is rotatably attached to the clamping module, which axially extends beyond the tubular end of the first tubular component.

21 Claims, 10 Drawing Sheets

(51) Int. Cl.
  *B23K 9/032* (2006.01)
  *B23K 9/173* (2006.01)
  *B23K 9/32* (2006.01)
  B23K 101/04 (2006.01)
  B23K 103/04 (2006.01)
(52) U.S. Cl.
  CPC .......... *B23K 9/327* (2013.01); *B23K 37/0217* (2013.01); *B23K 37/0241* (2013.01); *B23K 37/0252* (2013.01); *B23K 37/0282* (2013.01); B23K 2101/04 (2018.08); B23K 2103/04 (2018.08)

(58) Field of Classification Search
  CPC .... B23K 9/173; B23K 9/327; B23K 2103/04; B23K 2101/04; H05H 1/26
  USPC ............. 219/121.63, 121.48, 121.45, 121.64
  See application file for complete search history.

(56) References Cited

U.S. PATENT DOCUMENTS

| 8,973,244 | B2* | 3/2015 | LaValley ................ B21D 19/10 29/468 |
| 2005/0220249 | A1 | 10/2005 | Bon et al. |
| 2007/0175873 | A1 | 8/2007 | Akaba et al. |
| 2017/0182605 | A1* | 6/2017 | Rajagopalan ........ B23K 37/003 |
| 2018/0029154 | A1* | 2/2018 | Rajagopalan ........ B23K 9/0282 |

FOREIGN PATENT DOCUMENTS

| DE | 10 2009 043021 B3 | 3/2011 |
| DE | 102011118615 A1 | 5/2013 |
| EP | 0049037 A1 | 4/1982 |
| EP | 0060382 A1 | 9/1982 |
| EP | 0133411 A1 | 2/1985 |
| EP | 1811047 A1 | 7/2007 |
| EP | 2311595 A1 | 4/2011 |
| JP | 57195583 A | 12/1982 |
| JP | S59-150675 A | 8/1984 |
| JP | S60-203370 A | 10/1985 |
| JP | H06-47537 A | 2/1994 |
| JP | 2001-018066 A | 1/2001 |
| JP | 2005-219124 A | 8/2005 |

* cited by examiner

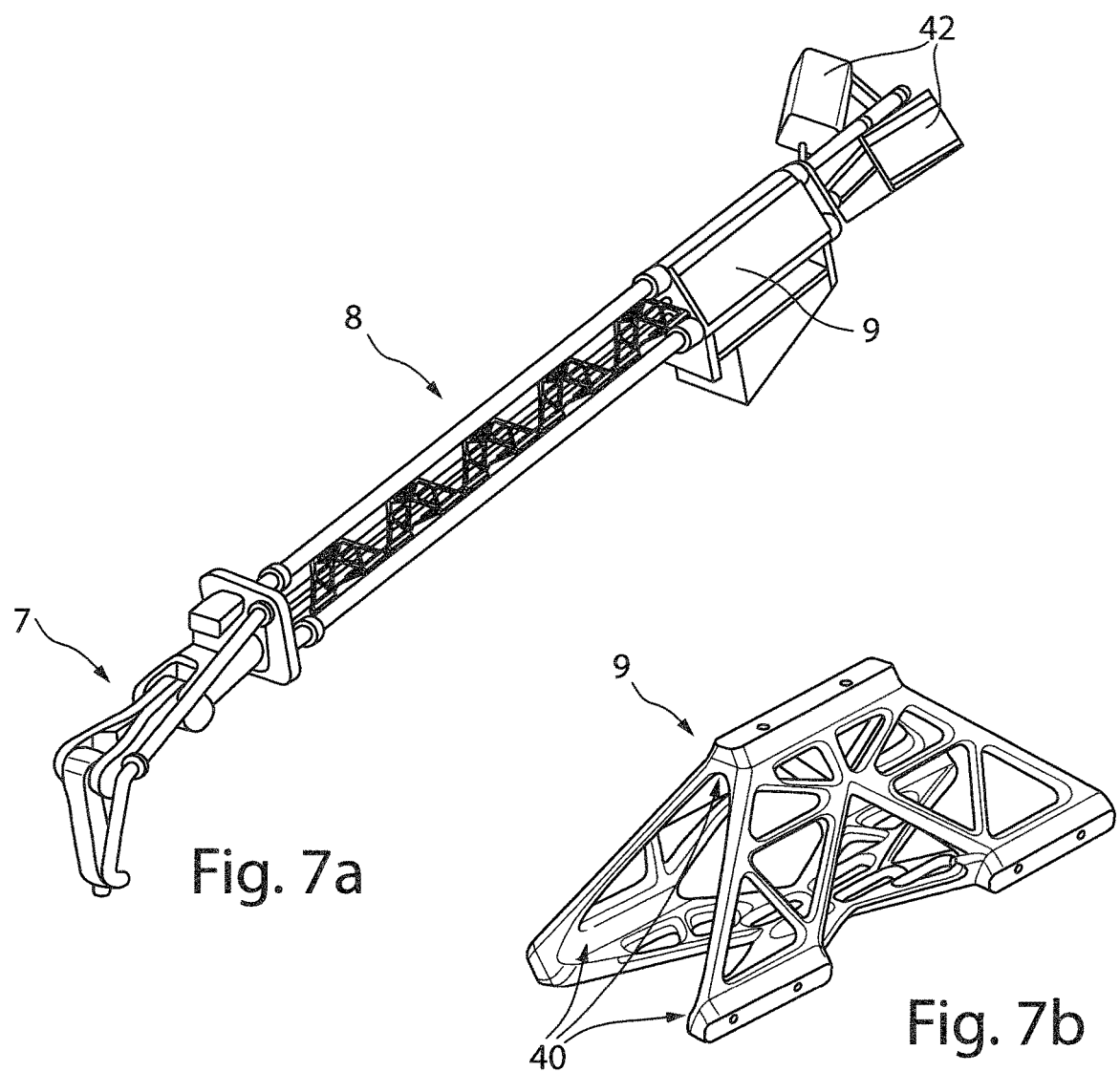
Fig. 7a
Fig. 7b
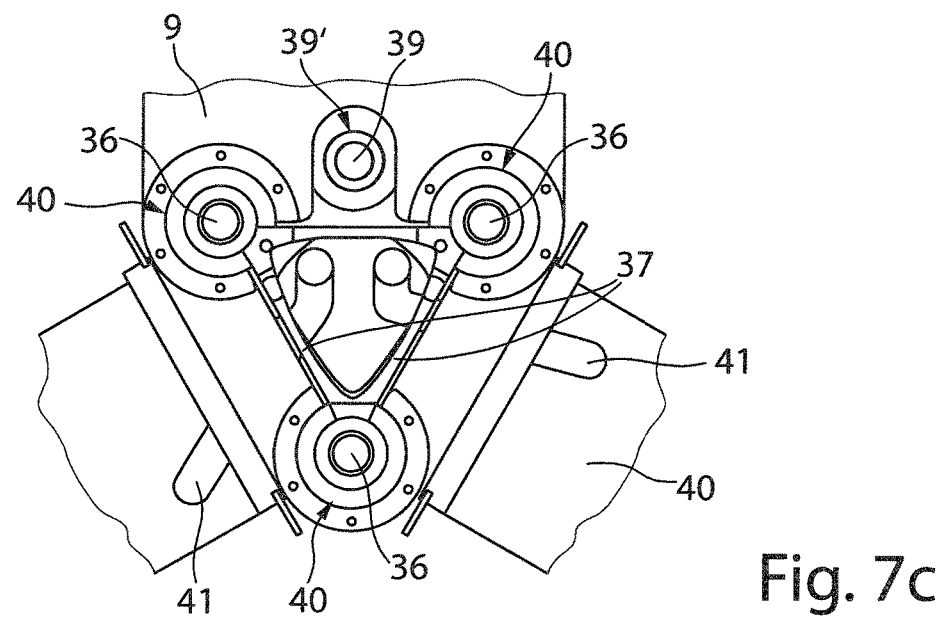
Fig. 7c

WELDING ASSEMBLY FOR PERMANENT JOINING OF A FIRST TUBULAR COMPONENT WITH A SECOND COMPONENT

CROSS-REFERENCE TO RELATED APPLICATIONS

Reference is made to International Application No. PCT/EP2016/055623 filed Mar. 16, 2016, which is incorporated herein by reference in its entirety.

BACKGROUND OF THE INVENTION

Field of the Invention

The invention relates to a welding assembly for permanent joining of a first tubular component with a second component along a two- or three-dimensional intersection curve, along which both components contact, comprising a securing assembly for detachably securely joining on a tubular end of the first component facing away from the intersection curve, a manipulator unit mounted indirectly or directly on the securing assembly such that it can pivot about a tube longitudinal axis of the first component, with the manipulator unit having a freely positionable manipulator end, and a welding tool attached to the freely positionable manipulator end.

Description of the Prior Art

The development of renewable energy sources has given rise to a growing need for offshore wind turbines, which in turn have to be grounded securely on or in the seabed by resource conserving foundation structures in the form of jackets, tripiles or tripods, all of which have structural steel tube constructions with tube joints as structural steel connecting elements of intersecting tubes. A variety of tube joints in X, Y, K and double-K configurations are used depending on the various foundation structure types. Within this design, the tube joint connectors vary in terms of connecting angle, positioning of the tube connectors, structural steel tube thicknesses and also diameter. As a result there are a very large number of different joint types that may be used even in the same framework structure. When two structural steel tubes are connected, which usually entails connecting a tube connector to a base tube with a larger diameter, the dimensions at issue generally require the joining to be done by welding. In this context, it is critical for the quality of the weld seam and that dimensional tolerance of the weld seam should be prepared correctly and that the two tube components be joined as accurately as possible along the three-dimensional intersection curve along which the two components contact each other.

Due to the large dimensions and weights of the parts to be joined, both the weld seam preparation and the process of joining the tube joint connectors by welding are most often carried out manually, so production is lengthy, inefficient and expensive. The use of welding robots to make tube joints of such kind is hindered by the large number of different tube connections. It has not previously been possible to conduct such operations with a single automated universal welding assembly.

In this context, DE 33 13 230 A1 discloses a method and a device for automatic welding of a tube connector to a larger base tube element, wherein the base tube element is mounted rotatably. When the tube element has been tacked to the base tube, a securing assembly with a welding arm assembly connected in articulated manner so as to be rotatable about the longitudinal axis of the tube connector is attached to the tube connector, in which the welding arm assembly can also be displaced axially in both directions as well as in the rotational direction about the axis of the tube longitudinal axis, so that a welding tool may be moved precisely along the three-dimensional intersection curve. However, given the dimensions of the known welding assembly for attachment to the tube connector, it is only suitable for joining tube connectors to a base tube section with tube axes that are orientated orthogonally with respect to each other.

The known device takes advantage of the fact that due to the rotatable positioning of the base tube section the welding process is always carried out in the "downhand position", so that the fastest possible welding speed and very high welding quality can be achieved. However this device is also associated with a disadvantage that handling of the tube components to be joined is limited by the size and weight of the components. Particularly when manufacturing offshore platforms the tube joints to be manipulated have a total weight of 30 tons or more, and the tubes are typically up 10 metres long with diameters in the order of 1 to 3 meters. Moreover, tube joints with tube angle constellations in which the tube longitudinal axis of the tube connector is aligned at an angle less than 90°, and preferably less than 45° relative to the tube longitudinal axis of the base tube, present spatial challenges because the welding tool cannot be rotated 360° about the tube longitudinal axis of the tube connector to be welded because of the radially projecting construction.

Very similar welding assemblies for joining two tubular components whose tube longitudinal axes are orientated orthogonally with respect to each other are disclosed in the following documents: EP 0060382 A1, EP 181 1047 A1, JP 60203370 A, DE 10 2009 043 021 B3, DE 30 05 153 A1 and EP 013341 1 A1.

Patent specification DE 10 2011 118 615 A1 describes a device for welding a tube connector along a base tube section with the tube axes forming an acute angle. In order to weld both tube parts along the three-dimensional intersection curve, a welding robot is used which is displaceable bidirectionally on a linear axis, but the robot is also only able to work on a partial section of the intersection curve. To enable welding to be completed, at least two, preferably three welding robots of such kind must be arranged around the tube components that are to be joined to each other.

Patent specification EP 2 311 595 A1 describes a submerged arc welding device for connecting two workpieces along a common intersection curve, wherein the welding device together with the components required for the welding process, such as the welding wire feed and controller, are mounted on a platform, and are arranged to be rotatable together with the welding tool about an axis about which the welding tool rotates in order to weld along the entire weld seam. The assembly is suitable for welding two tube parts whose tube longitudinal axes are orientated perpendicularly to each other.

A welding assembly similar to the welding assembly described above is disclosed in patent specification EP 0 049 037 A1. This welding assembly is capable of creating a welded joint between two tube parts whose tube longitudinal axes are orthogonal to each other. The welding assembly is mounted fixedly but detachably on a smaller tube part which is orientated vertically to a tube part with a larger diameter and is able to rotate about the tube longitudinal axis while a vertically lowerable welding nozzle which is able to close a gap between the two tube parts, are part of the welding process. All of the components needed to carry out the welding process are arranged on the rotatably mounted welding assembly.

Patent specification JP 57195583 A describes a welding assembly for welding a tube connector to a main tube which is mounted to be rotatable about a horizontal axis. The welding assembly is fastened to the end of the tube connector and includes a welding tool which can be guided rotationally about the longitudinal axis of the tube connector. The welding assembly is kept permanently in a position vertically above the weld as the weld is created along the weld seam, while the main tube rotates about its horizontally aligned tube longitudinal axis.

SUMMARY OF THE INVENTION

The invention improves a welding assembly for permanently joining a first tubular component with a second, preferably also tubular component, along a two- or three-dimensional intersection curve, along which both components contact. The welding assembly comprises a securing assembly for detachably securely joining to a tubular end of the first component facing away from the intersection curve, a manipulator unit mounted directly or indirectly on the securing assembly such that it can pivot about a tube longitudinal axis assigned to the first component, the manipulator unit has a freely positionable manipulator end and comprises a welding tool attached to the freely positionable manipulator end so that the welding assembly is as flexible, compact and lightweight as possible and is capable of performing welding tasks particularly for producing tube joints on site without the need for the parts to be joined to have separate supports. In particular, it is possible to weld tube joint constellations of any kind which have at least one tube connector. The tube longitudinal axis forms an acute angle of 45° and less with the tube longitudinal axis of a base tube section. The welding assembly also makes possible for at least one welding tool to rotate through at least 360° about the tube longitudinal axis of the tube connector. Preferably the welding assembly can rotate infinitely often about the tube longitudinal axis, thus enabling the creation of at least one completely uninterrupted, homogeneous weld seam along the intersection curve, without the risk of colliding with surrounding tube wall areas. The unlimited revolutions of the welding tool about the tube longitudinal axis make possible welding large wall thicknesses up to several centimeters thick and having a correspondingly large weld seam filling volume to each other. In this context, the weld seam filling volume should be filled completely by the multiple single "weld beads" from an unlimited number of passes over the weld seam. Further, the welding assembly should be attachable securely yet detachably without additional installation to tube connectors which have differing tube diameters.

According to the invention, a welding assembly for permanently joining a first tubular component to a second component along a two- or three-dimensional intersection curve, along which the two components contact each other, includes the manipulator unit having a 6-axis open kinematic chain in the form of a vertical articulated robot and is attached to an end of the frame. In addition, a supply module is provided to which at least one of the following components is attached: a control unit, an electrical energy supply unit, at least one reservoir for the material relating to the welding process, comprising welding wire and process gas.

At least one of the aforementioned components is connected to the welding tool via a connection line, and the supply module is mounted rotatably so that it is able to perform a rotational movement at the same time as the movement of the welding tool about the tube longitudinal axis, which permits infinite rotations of the welding tool about the tube longitudinal axis. The supply module may either be attached to a support structure constructed separately from the welding assembly in articulated manner so as to be freely positionable at least along one plane, or it may be connected to the carrier ring module.

The term "manipulator unit" is understood to mean a kinematic chain that provides a system of rigid bodies connected by articulations. The articulations may have different degrees of freedom. The articulations may be constructed as rotating articulations having at least one axis of rotation, or as push-pull articulations. The kinematic chain in the case of the welding assembly is realized as a 6-axis, open kinematic chain in the form of a vertical articulated robot.

The securing assembly of the welding assembly is supported entirely on the tubular first component. For this purpose, the frontal face of the clamping module assigned to the securing assembly is inserted axially in the first tubular component, which is open on one side. As the clamping module is subsequently spread radially, the securing assembly forms an axially secure, rotationally fixed non-positively and frictionally locking connection with the tube inner wall. The clamping module thus enters into operative connection with the tube inner wall of the first tubular component via radially displaceable friction elements. The radial extension of the individual friction elements may be carried out to varying degrees, so the same clamping module may be used for fastening on tubular components with inner tube diameters that may differ from each other by up to a meter, according to the design and dimensioning of a lever mechanism driven by an actuator that radially extends the friction elements.

In a preferred embodiment, the securing assembly is equipped with a mechanical energy storage unit, which radially acting clamping force generated by the actuator-driven lever mechanism so that in the event of thermally induced radial expansion of the first tubular component, as may happen during long welding processes, the friction elements are entrained accordingly by the exertion of force to maintain the radial clamping force and thus ensure that the welding assembly is retained securely against the first tubular component in each case at all times.

The clamping module is also connected to a support platform, which may be moved to bear directly or indirectly on the axially frontal tubular end of the first component. and The module provides axial bracing of the securing assembly against the first component. The support platform also serves to support the carrier ring module, which is mounted in axially fixed manner and is rotatably about an axis of rotation relative to the support platform. The axis of rotation is coincident with the tube longitudinal axis inside the first tubular component when the clamping module is in the joined state.

In order to enable the carrier ring module to be mounted rotatably relative to the support platform, the carrier ring module preferably includes at least one carrier ring which has a ring segment which is connected detachably securely to the support platform in an axially and a rotationally fixed manner and arranged to be rotatable with respect to the carrier ring. To ensure that the at least one carrier ring is rotationally displaced relative to the ring segment, which is connected in fixed manner to the support platform, a drive motor is used which is connected in fixed manner to the carrier ring and engages with the ring segment via a gearbox mechanism.

The at least one carrier ring of the carrier ring module, which is arranged to be rotatable by a motor relative to the clamping module, advantageously has a circular peripheral rim, along which at least one retaining device is attached and engages a linear frame in such manner that the linear frame is displaceable bidirectionally along a linear axis relative to the retaining device by an actuator. If a clamping module has been inserted in the first tubular component, the linear axis of the linear frame extends parallel to the tube longitudinal axis of the tubular first component, wherein the linear frame is positioned with the smallest possible radial separation from the outer wall of the first tubular component. As will be explained in the following, the actuator-driven operation of the linear frame is assured by a motorized spindle mechanism which is in engagement with the retaining device attached to the carried module to assure controlled, bidirectional displacement of the linear frame. The linear frame preferably has a truss reinforcing construction, which is extremely rigid and consequently has very low static deflection. The linear frame may be up to 4 meters long. On one end thereof the manipulator unit in the form of a kinematic chain, specifically in the form of a 6-axis vertical articulated robot, is arranged for further spatial positioning of the welding tool attached to the free end of kinematic chain. The spatially compact articulated robot has a dead weight of less than 100 kg, preferably about 60 kg, and is thus freely pivotable and positionable in space. In this way, both the articulated robot and the welding tool attached thereto may be pivoted completely around the tube connector as closely as possible on the outer wall of the tube connector, so that it is possible to produce a continuous weld seam along the join contour without colliding with the surrounding wall parts.

Primarily to ensure that the welding tool is supported to be rotatable about the clamping module attached fixedly inside the tube connector so that the welding tool can be rotated multiple times in a uniform direction about the tube axis of the tube connector to create an uninterrupted, completely encircling weld seam, which may be multiple welding layers, it is important to provide a continuous supply of energy and material for the welding tool and the manipulator unit. To this end, a preferred embodiment provides a supply module which is a structurally separate unit. For this purpose, the supply module is equipped with a module support on which all supply units for the welding tool are mounted, including for example a control unit for activating and actuating the welding tool, an electrical energy supply unit and at least one reservoir for the materials needed for the welding process, e.g., welding wire, process gas etc.

The individual supply units are connected to the welding tool via corresponding connector lines. To prevent complications from arising along the connector lines due to the rotation, it must be ensured that the rotation of the supply unit is synchronized with that of the welding tool.

In a preferred variant according to the invention, the supply module is mounted rotatably on a separate support structure which is not connected to the welding assembly. The support structure preferably protrudes above the tube parts to be welded, so that the supply module is secured on the support structure for spatial travel and rotation and can be moved spatially. The support structure with the supply module attached thereto can preferably also be used to mount the welding assembly on the tube connector and dismount it therefrom.

Alternatively, it is possible to couple the supply module with the carrier ring module of the welding assembly mechanically, to ensure that the two modules are connected to each other in non-rotatable manner.

The welding assembly of the invention has a preferred way of connecting "tube joints" in which tube connectors with practically any diameter are to be welded to a base tube. The tube connectors may be arranged at practically any angle relative to the tube longitudinal axis of the base tube. A possible difficulty regarding collision between the welding assembly and the tube connector may be eliminated, since the welding assembly can be of compact construction with small dimensions. The modular construction of the welding assembly according to the invention means that two, three or more linear frames, each with manipulator units and the attached welding units can be mounted thereon can be fastened to the carrier ring module. This enables the welding time needed to fully weld a tube connector to a base tube to be reduced considerably.

BRIEF DESCRIPTION OF THE DRAWINGS

In the following text, the invention will be described for exemplary purposes without limitation of the inventive thought based on embodiments thereof and with reference to the drawing. In the drawing:

FIG. 4 b) illustrates a partial longitudinal cross section through the support platform of the clamping module;
FIG. 4 c) illustrates a view of a friction element assembly including a guide rail and a carriage;
and
   FIG. 4 d) illustrates a detailed view of a ring carrier module.

FIGS. 7a-c show in FIG. 7a) the linear frame, in FIG. 7b) the retaining device and in FIG. 7 c) a cross section through the retaining device with frame.

DETAILED DESCRIPTION OF THE INVENTION

Figure 1:
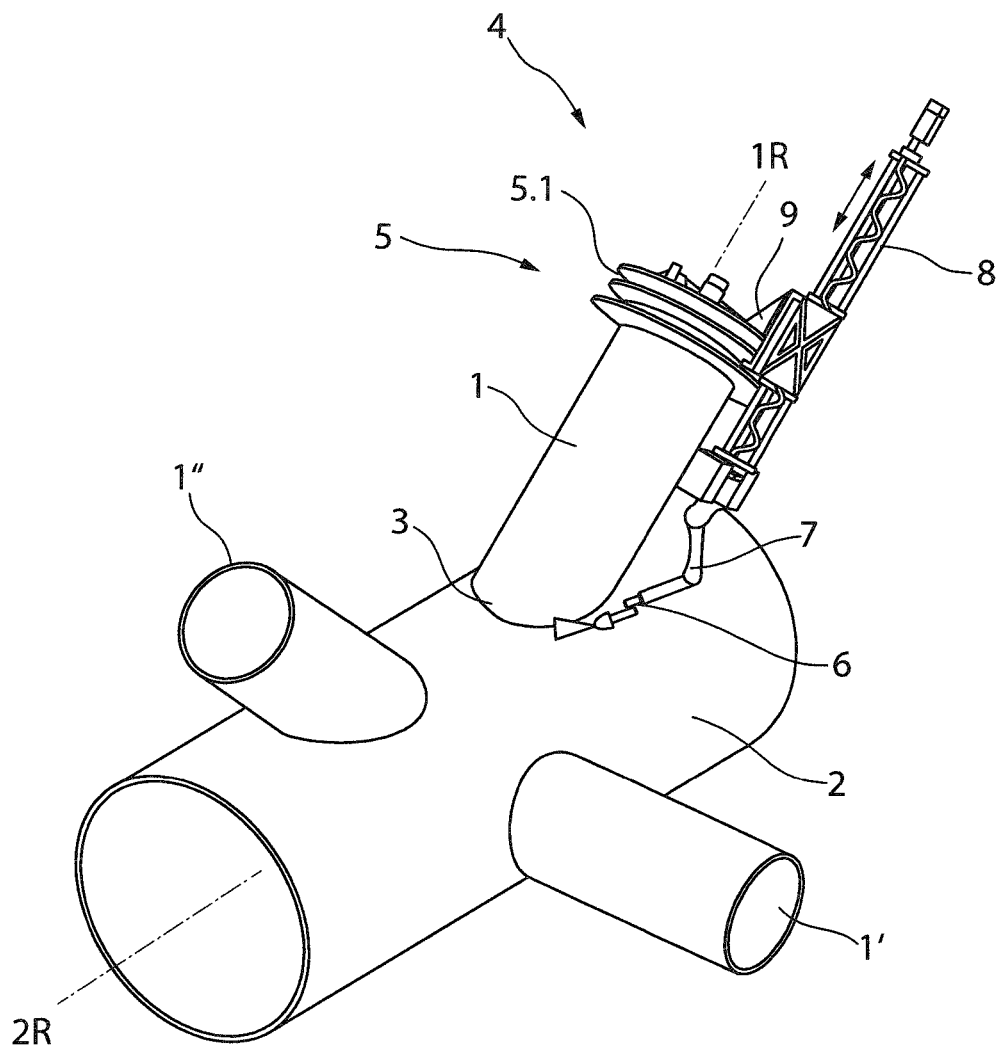
FIG. 1 is a perspective overall view of the welding assembly designed according to the invention disposed on a tube joint.

FIG. 1 is a schematic representation of a tube joint with a tube connector identified as first tubular component 1, having one frontal face which is or will be connected to a second tubular component 2, which is hereafter referred to as the base tube, along a three-dimensional intersection curve 3 by welding technology. Base tube 2 has a larger tube diameter than tube connector 1. Of course, it is possible that the tube diameters of the tube connector and the base tube have the same dimensions. The tube connector 1 illustrated in FIG. 1 has a tube longitudinal axis 1R, which is aligned at an angle less than 90°, preferably 45° relative to tube longitudinal axis 2R of base tube 2.

The welding process which joins tube connector 1 to base tube 2, is carried out with the welding assembly 4, which is attached solely to tube connector 1. That is a separate support for base tube 2 is not needed for the welding operation. Welding assembly 4 is braced exclusively against tube connector 1 and enables the spatial positioning and guidance of welding tool 6 around tube connector 1 in very close spatial proximity to and along three-dimensional intersection curve 3. For this purpose, welding tool 6 is attached to the kinematic end of a manipulator unit 7, which preferably has an articulated robot arm, which is preferably a 6-axis vertical articulated robot arm. Manipulator unit 7 enables the spatial precise positioning of welding tool 6 along and around at least six axes. Manipulator unit 7 is itself fastened by one end to a linear frame 8, which is connected to a securing assembly 5 via a retaining device 9. Linear frame 8 is mounted to be displaceable by motor power bidirectionally along its longitudinal extension relative to retaining device 9.

Securing assembly 5 provides a reliable and detachably secure attachment of the entire welding assembly only to tube connector 1. For this, securing assembly 5 includes a carrier ring module 5.1 which is rotationally movable by a motor to enable welding tool 6 to make a complete revolution around tube axis 1R of tube connector 1 and thus also along the entire extent of three-dimensional intersection curve 3. Carrier ring module 5.1 is connected to a clamping module 5.2 (not shown in FIG. 1). This configuration ensures a detachably firm hold against the inner wall of tube connector 1 by a spreading mechanism and braces the entire welding assembly against tube connector 1. The welding assembly 4 according to the invention features a compact structure lying closely against tube connector 1 and enables the spatial positioning of welding tool 6 even in spatially constricted joining zones. For the sake of completeness only, it should be noted that the tube joint 2 illustrated in FIG. 1 has further tube connectors 1', 1". Tube connector 1' has an orthogonal axis alignment, and further the tube connector 1" has a tube axis alignment positioned at an acute angle relative to tube axis 2R. The compact, modular construction of the welding assembly according to the invention makes possible welding tube connectors at almost any angle of inclination and having almost any dimensions to a body that is designated as a second, preferably tubular component.

Figure 2A:
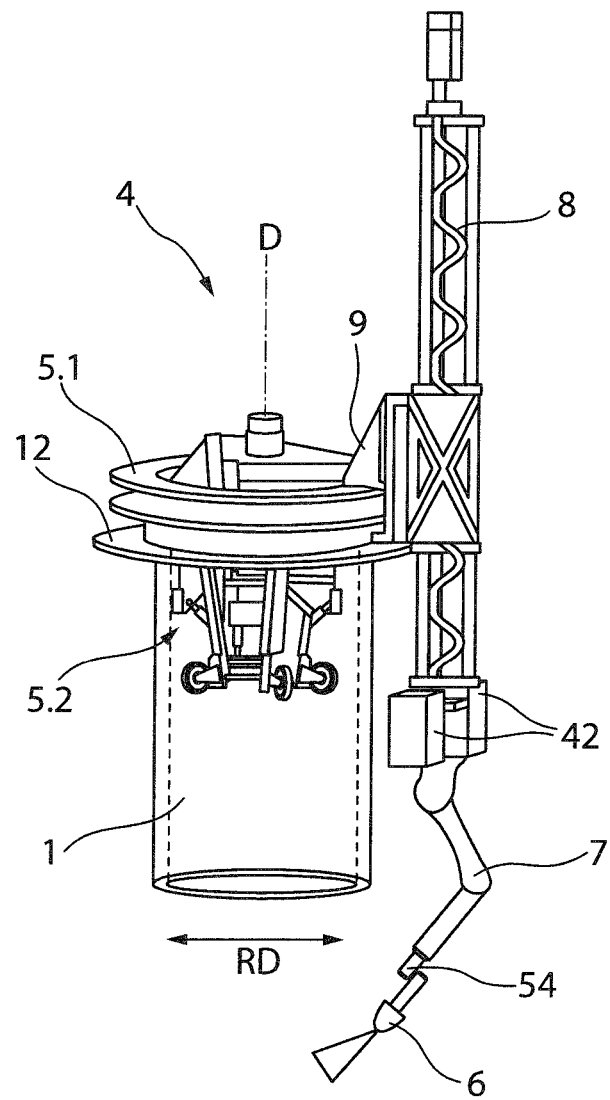
FIGS. 2a and b show arrangements of the welding assembly inside a tube joint with
   a) smaller diameter and FIG. 2 b) larger diameter in FIG. 2b FIGS. 3a and b show the clamping mechanism in
   a) a disengaged position and b) in an engaged position with the tube inner wall.
Figure 2B:
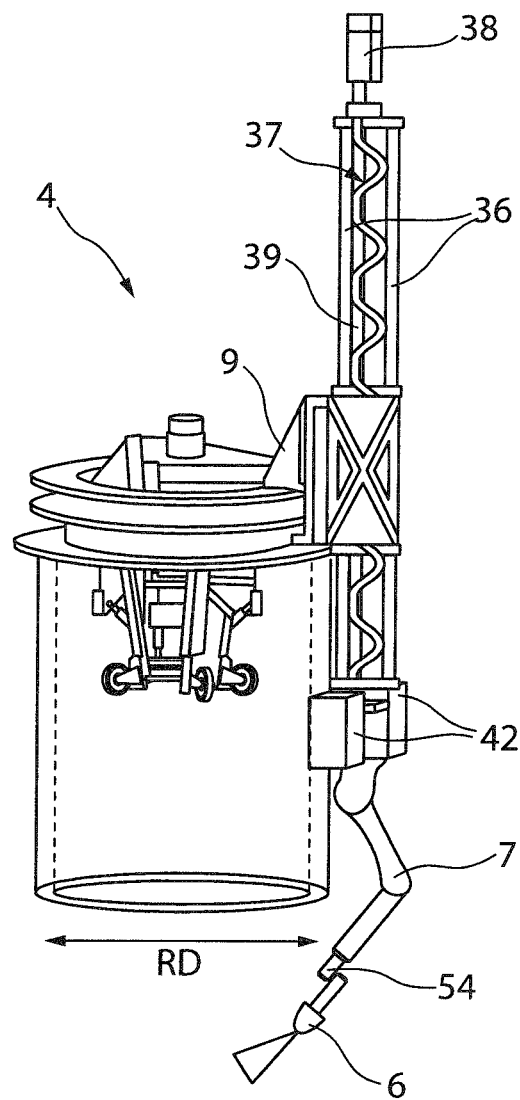

FIGS. 2a and b illustrate the range of utility of a single welding assembly 4 according to the invention on tube connectors 1 which each have different tube inner diameters. Besides the components of welding assembly 4 noted earlier, the illustrations further show clamping module 5.2, which enables axially and torsionally fixed joining with the tube inner wall of the respective tube connector 1 by a motorized lever mechanism. Due to the continuous radial spreading of friction elements (element 10 in FIGS. 3a and 3b) provided on clamping module 5.2, which elements will be described in greater detail in the following text, clamping module 5.1 is fastenable for detachably securely fixing in tube connectors with tube inner diameters RD between 1 m, See FIGS. 2a, and 1.50 m, See FIG. 2b.

Figure 3A:
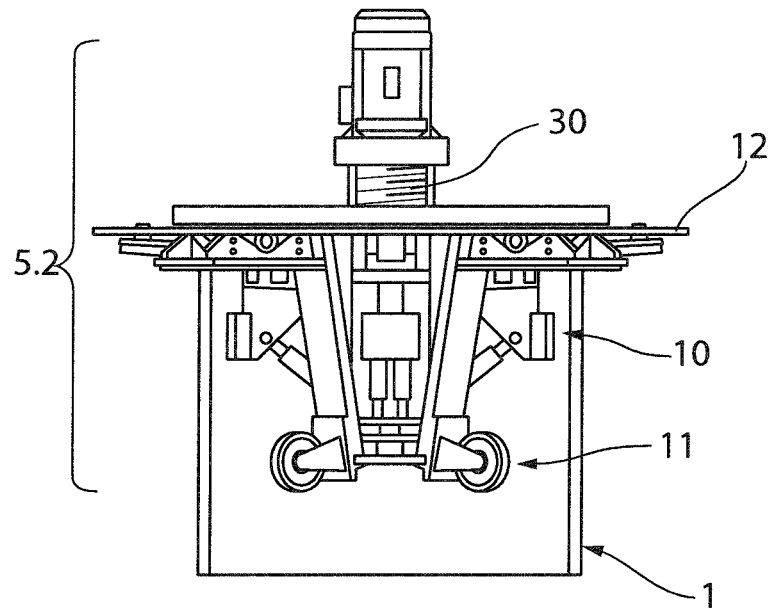
Figure 3B:
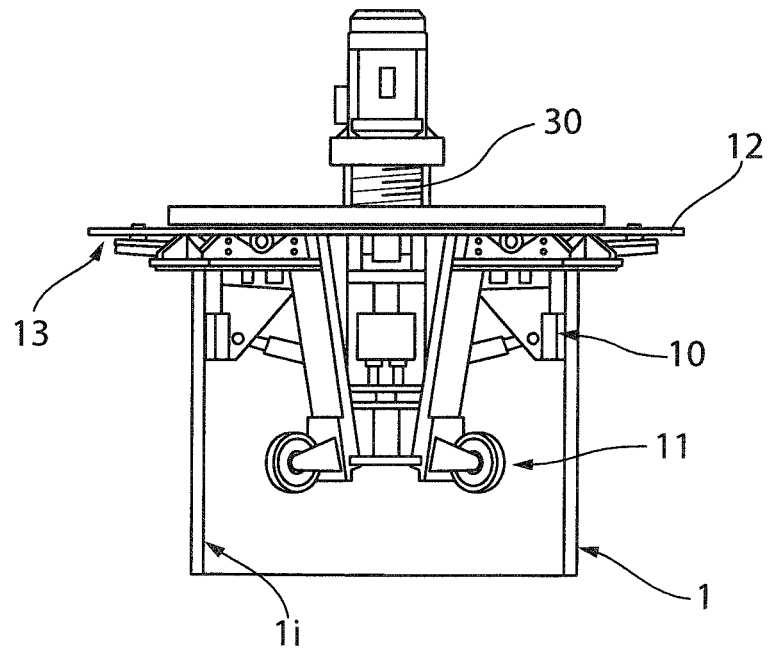

FIG. 3a shows a partial longitudinal cross section through the clamping module in a disengaged state inside a connector tube 1. FIG. 3b shows a corresponding partial longitudinal cross section through clamping module 5.2 in the engaged state, in which a force is applied to friction elements 10 to bring them into radial engagement with tube inner wall 11.

As shown in FIGS. 3a and b, clamping module 5.2 may be inserted in the interior of tube connector 1 through the frontal end of tube connector 1. The clamping module 5.2 is fitted into tube connector 1 more easily with the aid of guide rollers 11. In order to provide axial support for clamping module 5.2 on the frontal end of tube connector 1, clamping module 5.2 has a support platform 12 which is an annular plate and an underside 13 facing tube connector 1, to which cushioning elements (shown in FIG. 4a as element 14) are attached, evenly spaced around the circumference of the ring (see FIGS. 4a and b), each having a radial extension along at least sections of which an electrically insulating element 15 is attached to guarantee that clamping module 5.2 is thermally and particularly also electrically insulated from tube connector 1, to insulate welding currents from the clamping module.

Thus, the frontal end of tube connector 1 bears on the electrically and preferably thermally insulating elements 15 of cushioning element 14, which define the bearing plane 16 of support platform 12. Cushioning elements 14 each have a radial extension that is dimensioned such that the frontal ends of the tube connectors, each having different dimensioned tube inner diameters and outer diameters, each bear on cushioning elements 14 when annular support platform is aligned centrally relative to the tube connector. Spacers 17, which may be radially positioned variously depending on the tube dimensions, are provided radially along each individual cushioning element 14 to make centering easier to center support platform 12 relative to the frontal end of tube connector 1.

As was noted previously, guide rollers 11 are mounted on support platform 12 and separated axially therefrom by supporting struts 18. Rollers serve to simplify the process of inserting the clamping module in the respective tube connector, which will be explained later. In the embodiment, four guide rollers 11 are provided, and are connected for mutual stabilization via a common connector plate 19, which is positioned at a fixed, predetermined distance from support platform 12.

Figure 4A:
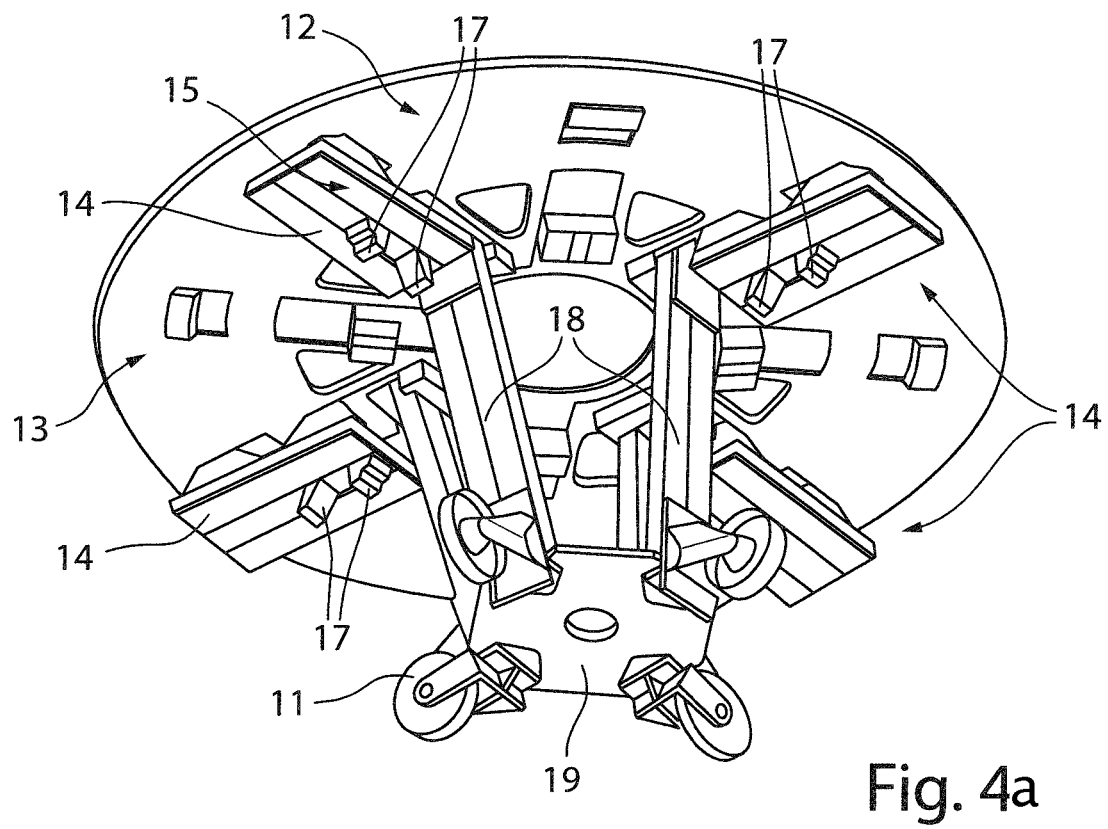
FIGS. 4a, b, c, and d show detailed views of the clamping module as follows.

As is shown in FIG. 4a, annular support platform 12 has a central opening through which—as will be explained later—a motorized spindle mechanism which protrudes to drive a lever mechanism that displaces friction element 10 radially.

Figure 4B:
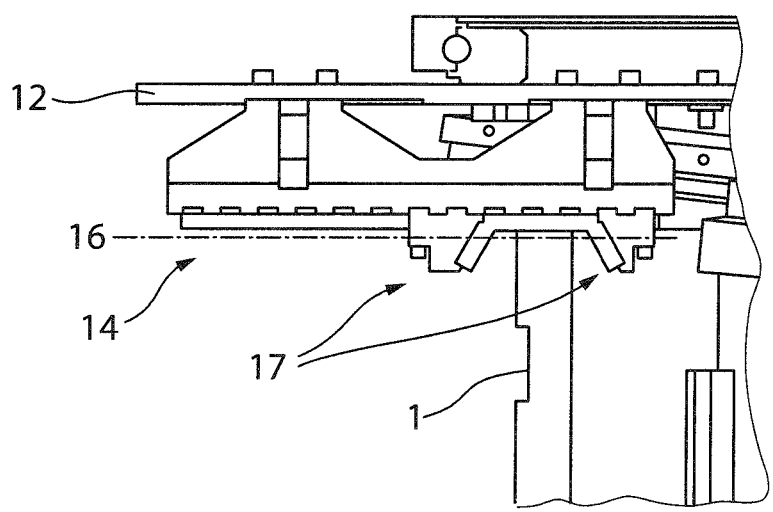
FIG. 4 a) illustrates a perspective diagonal view of the underside of the support platform.

FIG. 4b illustrates a cushioning element 14 including a support platform 12 facing a bearing plane 16. A spacer 17 contacts insulating element 15.

Figure 4C:
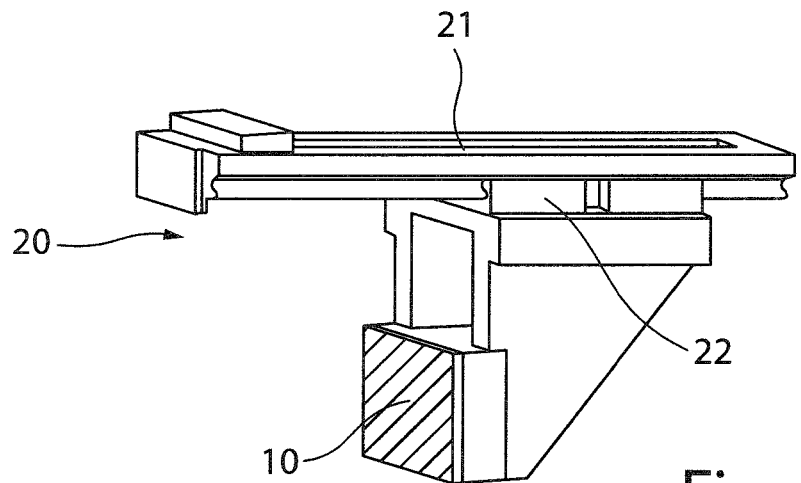

FIG. 4c illustrates a friction element assembly 20 which includes a friction element 10, a guide rail 21 and an assembly carriage 22.

Figure 4D:
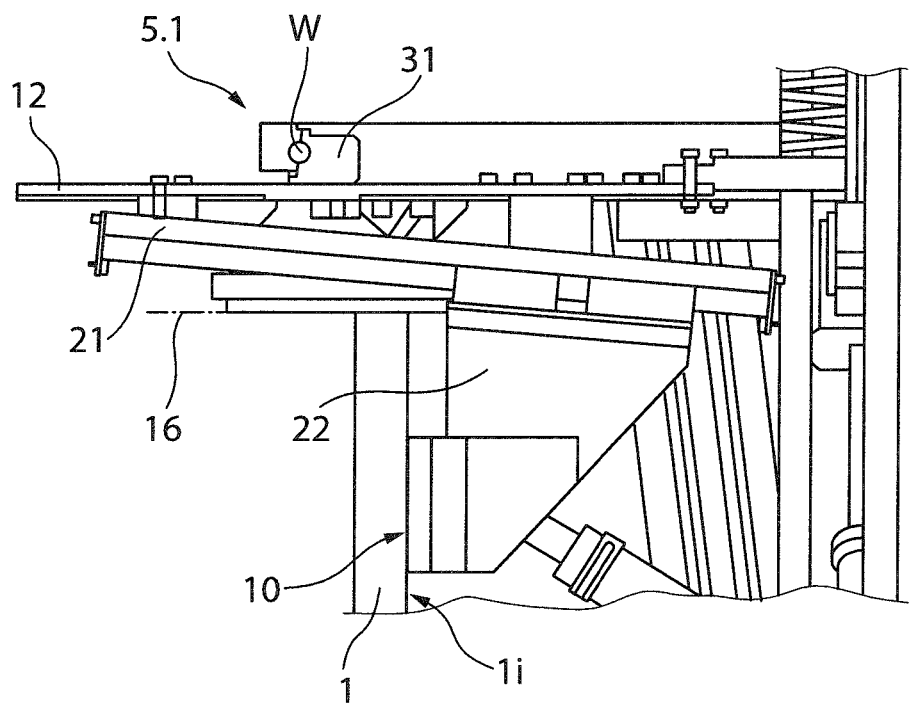

FIG. 4d illustrates a carrier ring module 5.1. The first tubular component 1 supports the support platform 12, carriage 22 and ring assembly 31.

The outer ring diameter of support platform 12 is larger than the tube outer diameter of the respective tube connector 1. The result is that cushioning elements 14 mounted on the underside 13 of support platform 12 also have a larger radial extension than the outer diameter of the tube connector that is to be joined in each case.

Additionally, a friction element assembly 20 is attached in the circumferential direction between each two cushioning elements 14 of the annular support platform 12 (not shown in FIG. 4 to preserve clarity), which are shown in FIGS. 4c and d. Friction element assembly 20 comprises a guide rail 21, and a carriage 22 mounted to be displaceable bidirectionally thereon, and on which friction element 10 is mounted. Guide rail 21 extends radially to the tube connector axis similarly to cushioning elements 14 and is mounted on support platform at an angle to bearing plane 16. Guide rail 21 is preferably tilted at an angle $\alpha$ relative to bearing plane 16, wherein $0° < \alpha < 10°$, which preferably is $5°$.

All friction element assemblies 20 are in operative connection with an actuator unit. The actuator unit is in the form of a lever mechanism, by which the friction element assemblies 20 may be shifted from a first position in which friction element assemblies 20 are displaced a distance from the inner wall of the tube connector to a second position in which the friction element assemblies are each displaced at a second distance, greater than the first distance, from the axis. The result is that friction elements 10 of the respective friction element assemblies 20 each form a non-positively and frictionally locking connection with the tube inner wall. Due to the inclination of the guide rails 21 relative to the bearing plane 16 described earlier, friction elements 10, which form a non-positively and frictionally locking connection with the tube inner wall, exert both a radially acting retaining force and an axially acting tensile force which pulls clamping module 5.2 axially into tube connector 1.

The friction element 10, which comes into contact with tube inner wall 1$i$, may be replaced with elements that better fit the inner diameter of the respective tube connector 1. Friction elements 10 are advantageously manufactured from the same insulating material as the insulating elements 15 along cushioning elements 14.

Carriage 22 is advantageously dimensioned and constructed in such manner that friction elements 10 which come into contact with tube inner wall 1$i$ are arranged at a certain axial distance from guide rail 21 and thus are also at an axial distance from the open frontal end of tube connector in the joined state.

Figure 5A:
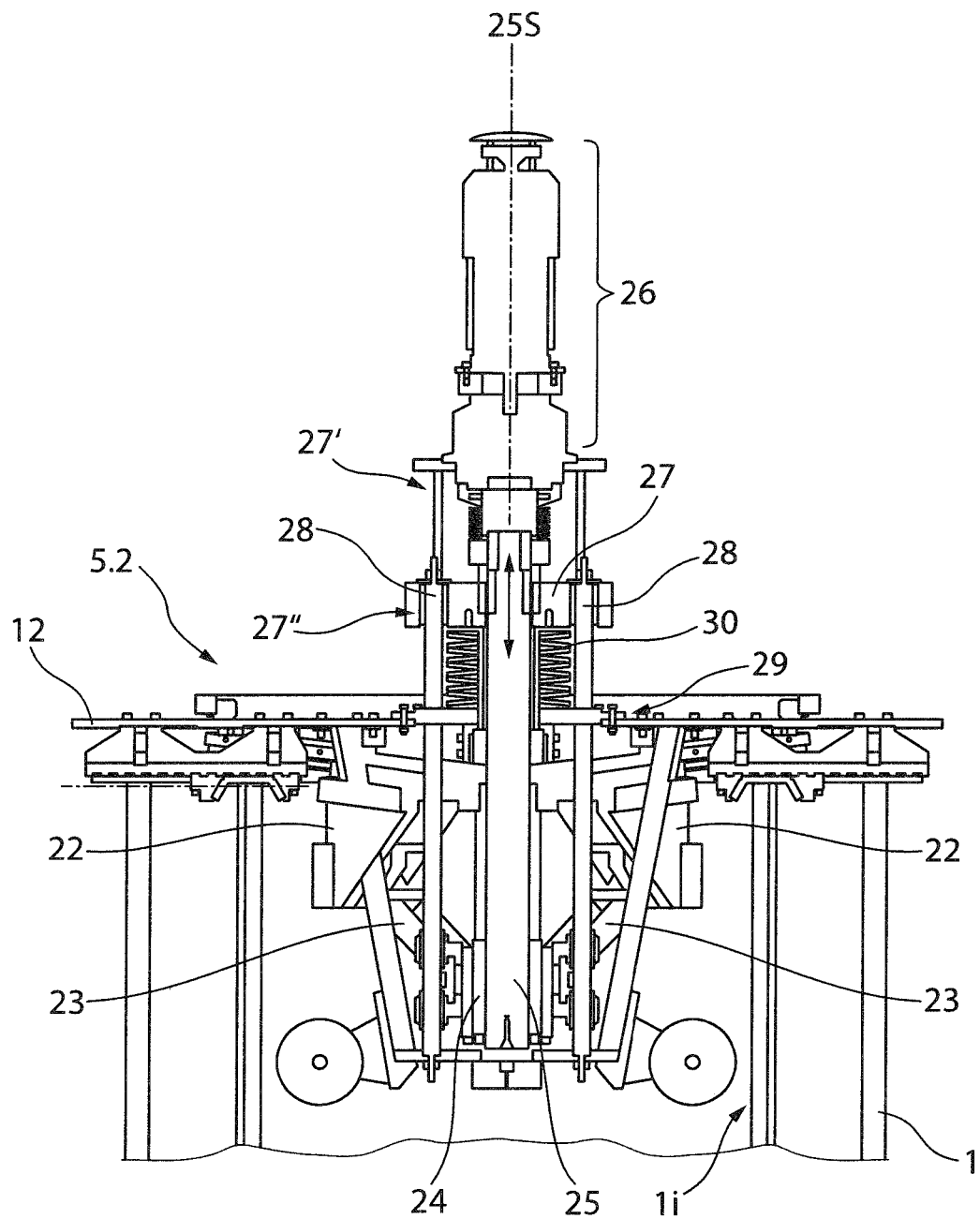
FIGS. 5a and b show views of the clamping module.
Figure 5B:
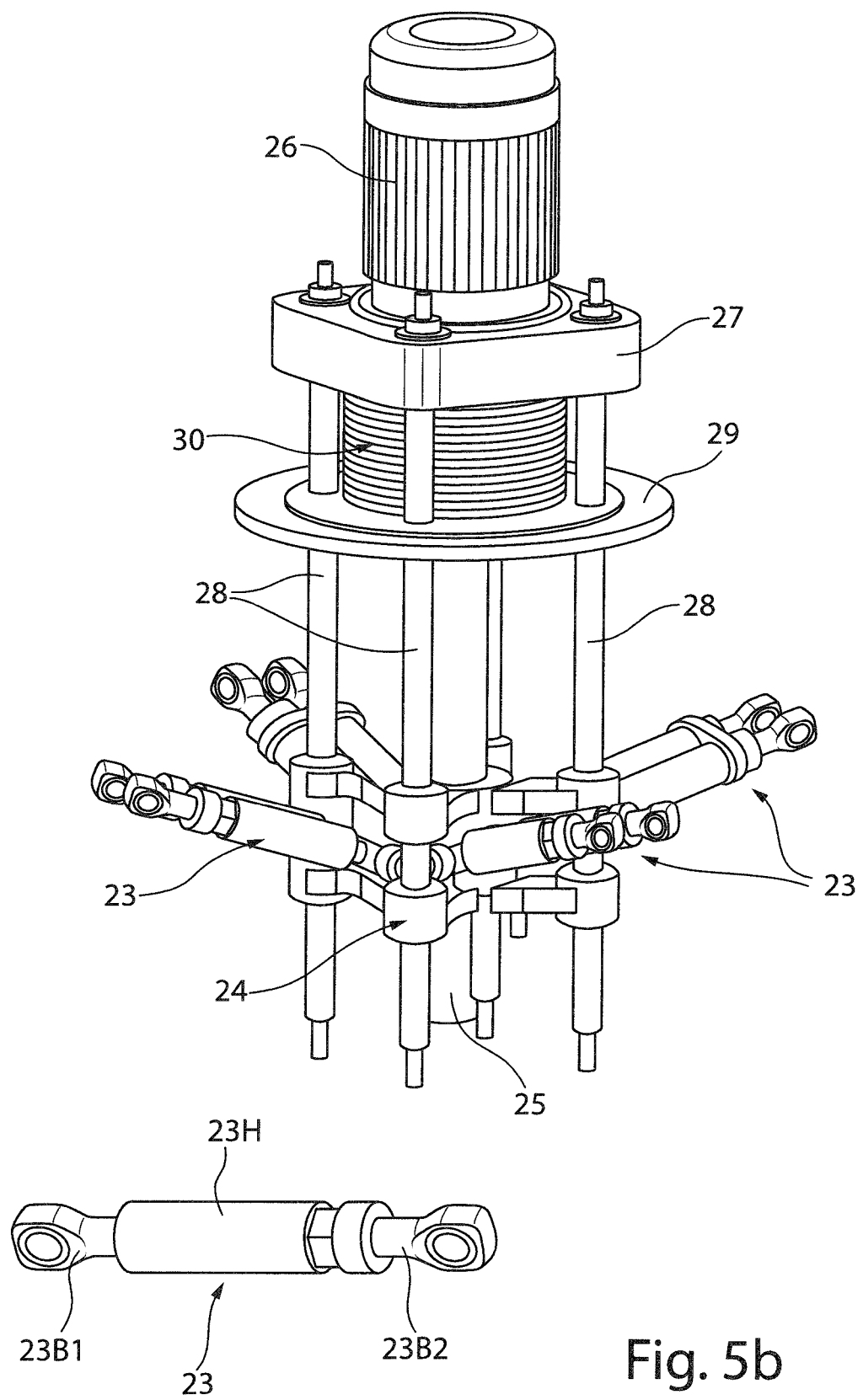

A common actuator unit, which is in operative connection with the friction element assemblies 20 via a lever mechanism, serves to displace friction element assemblies 20 radially. To explain the common actuator unit which is designed as a linear actuator, reference should be made to FIGS. 5 $a$, $b$. FIG. 5$a$ shows a longitudinal cross section through a clamping module 5.2 that is inserted in a tube connector. FIG. 5$b$ shows the common actuator unit with the lever mechanism on its own. The following descriptions relate to both illustrations equally. Accordingly, the carriage 22 of each friction element assembly 20 is an connected in articulated manner to one side of a coupling link 23 (see also FIGS. 4$c$ and 5$b$), the other side of which is connected in articulated manner to spindle nut 24, which is guided along a spindle 25. The upper end of spindle 25 is connected to a drive motor 26. Motor 26 is connected via a holding frame 27' fixedly to a motor plate 27 through which the four guide rods 28 protrude on sliding mounts. The sliding mount of each guide rod 28 is formed by a ball bushing 27" integrated in motor plate 27. The rod ends of guide rods 28 are connected fixedly to connector plate 19. A spring element 30, preferably in the form of a plate spring assembly, is fitted between motor plate 27 and a base plate 29 that is connected fixedly with support platform 12, and braces motor 26 as well as holding frame 27' and motor plate 27. Guide rods 28, which protrude through base plate 29, are also on sliding mounts.

Starting with the constellation illustrated in FIG. 5$a$, when spindle 25 is rotated appropriately, spindle nut 24 is moved vertically upwards which causes the carriages 22 of friction element assemblies 20 to be moved radially outward by coupling links 23 to come into contact with tube inner wall 1$i$. The length of the individual coupling links 23 is preferably such that in the engaged state coupling links 23 form an angle preferably between $80°$ and $85°$ with the longitudinal axis 25S of the spindle. In order to ensure that this angle is maintained for different tube connector inner diameters, the lengths of the individual coupling links 23 may be adapted. In a preferred variant for realizing coupling links 23, as shown in the bottom view in FIG. 5$b$ the links have a sleeve 23H with oppositely running internal threads in each end. A bolt element with eye 23B1, 23B2 is screwed into these internal threads on both ends, and the total length of the coupling length can be determined by the depth to which the bolts are screwed in.

The inclined arrangement of the guide rails 21 of each individual friction element assembly 20 generates a tensile force which pulls axially towards the interior of tube connector 1 as soon as friction elements 10 of the friction element assemblies 20 are pressed against tube inner wall 1$i$ by the force exerted on them. This tensile force in addition to the dead weight force of motor 26 with holding frame 27' and motor plate 28 is also sufficient to compress plate spring assembly 30. In this way, mechanical tension energy is stored temporarily in plate spring assembly 30. Since each tube connector 1 to be joined is likely to undergo thermal expansion due to the heat introduced during the welding process, it is important that friction element assemblies 20 be entrained radially to match this expansion and maintain the clamping force. In order to avoid re-activating the spindle drive motor for this, the mechanical tension energy stored temporarily in plate spring assembly 30 is used to compensate for the thermal expansion of the tube connector by exerting a force causing carriages 22 to track against the tube connector inner wall. To activate drive motor 26, which is typically not designed as a servomotor, proximity or limit switches are used to ensure that that motor travels exactly the same distance until plate spring assembly 30 is clamped to the same degree. Thus, the drive motor receives a signal and is stopped after the limit switch is triggered.

If the drive motor 26 is a servomotor, the limit switches can be omitted to ensure that the spindle 25 can still be driven by a motor with positional control.

Figure 6:
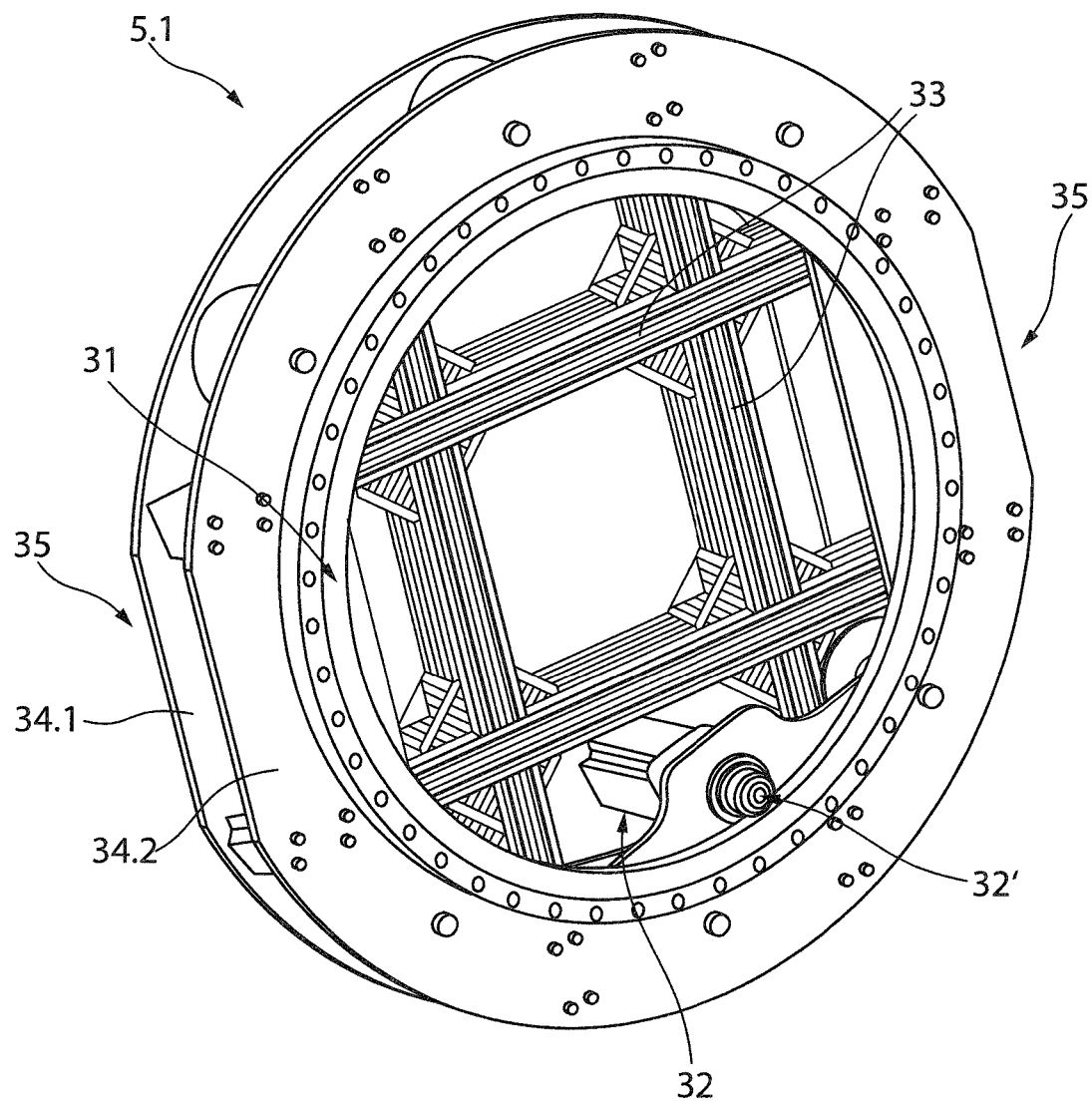
FIG. 6 shows a view of the carrier ring module.

FIGS. 2$a$ and 2$b$ show that carrier ring module 5.1 is mounted on the upper side of support platform 12. To ensure that carrier ring module 5.1 is mounted on support platform 12 rotatably about an axis of rotation D coincident with the tube connector longitudinal axis, carrier ring module 5.1 has a ring segment 31 which is connected fixedly to support platform 12, and on which carrier ring module 5.1 is supported in rotatable manner, preferably via a roller bearing W. See also FIG. 4$d$. A further illustration in this respect is shown in FIG. 6, which shows a perspective view of carrier ring module 5.1 from below. An interior gearing arrangement (not shown in more detail) is provided on the inner side of ring segment 31, with which a drive wheel 32' of a servomotor 32, which is connected fixedly to carrier ring module 5.1, engages.

Carrier ring module 5.1 includes two carrier ring plates 34.1 and 34.2 which are connected fixedly via a strut structure 33 with two peripherally flattened contact sections 35. Each section is provided on the periphery of the rims thereof. The sections are located diametrically opposite each other on the rims of the two carrier ring plates 34.1, 34.2 and have a retaining device 9 (not shown in FIG.) See FIGS. 2$a$ and $b$ on which is mounted a retaining device for approaching with a linear frame 8. The use of two linear frames 8 and the welding tools connected therewith on the carrier ring module 5.1 which is mounted rotatably relative to clamping module 5.2 enables the welding task to be completed in a significantly shorter time than when a single welding tool is used.

The diameter of carrier ring module 5.1 should be approximately same size as the tube connector diameter. That is, its diameter should be only slightly larger to minimize the radial expansion through the tube connector, so that tube connector constellations in which the tube connector longitudinal axis join the main tube longitudinal axis at an angle less than 45° can also be welded.

In an advantageous embodiment, linear frame 8, which is guided bidirectionally along retaining device 9 as seen in FIGS. 2*a* and *b* and FIGS. 7*a, b*, and *c*, has three parallel longitudinal struts 36. Each strut may be several meters long, that is as much as 3 to 5 meters. See FIGS. 2*a* and *b* and FIG. 7*a*. FIG. 7*a* shows a linear frame 8 on its own, FIG. 7*b* shows a separate view of a retaining device 9, and FIG. 7*c* shows a cross section through a retaining device 9 with an internally guided linear frame 8.

The three longitudinal struts 36 of linear frame 8 are connected fixedly to each other by an internal truss structure 37, for example, by adhesive bonding which forms a rigid frame structure that is able to sustain loads from combined vertical and horizontal movements with no significant self-deformations. A spindle 39 driven by a servomotor 38 and which is in engagement with a spindle nut 39' also extends parallel to longitudinal struts 36. See FIG. 7*c*. The spindle 39 is connected fixedly to retaining device 9. Longitudinal struts 36 are guided in sliding manner along retaining structure 9, so that the entire linear frame 8 is displaceable bidirectionally by the spindle wheel drive described earlier. That is the frame 8 may be raised or lowered for the purposes of the situation illustrated in FIGS. 2*a* and *b*. For this purpose, the three longitudinal struts 36, which function as guide rails at the same time passing through half-open ball bushings 40 which are integrated in retaining device 9 so that the stiffening truss structure 37 can be moved towards retaining device 9 without colliding. The construction is very lightweight and also makes it possible to route cables, welding wire or other supply lines 41 through the stiffened structure of linear frame 8. At the bottom end, which faces servomotor 38, the manipulator unit 7 described earlier is attached and is supplied with both energy and material essential for the welding operation via supply units 42 attached to linear frame 8. In the case of the embodiment illustrated in FIGS. 2*a* and *b*, supply units 42 are attached to the lower end of linear frame 8. In the case of the embodiment illustrated in FIG. 7*a* they are attached to the top end of frame 8. Manipulator unit 7 is preferably a six-axis vertical articulated robot, which positions the welding tool 6 mounted thereon precisely with respect to the three-dimensional intersection curve 3 along the tube connector using appropriate sensor systems. A sensor unit 54 is advantageously located on the freely positionable manipulator end for contactless detection of the shape and/or size of an intermediate space or groove recess along the intersection curve which is to be filled by welding. Sensor unit 54 is advantageously a line interruption sensor, with which the real cross section of the weld layer to be filled is measured before welding begins. Path planning and how the next weld layer will be deposited in the corresponding weld seam cross section is then carried out on the basis of this information.

In welding processes that consume substantial amounts of energy and materials, in which the welding tool passes around the tube connector longitudinal axis multiple times to form a multilayer weld bead along the weld seam, a continuous external supply of energy and welding materials must be supplied to the supply unit 42 mounted directly on linear frame 8.

Figure 8:
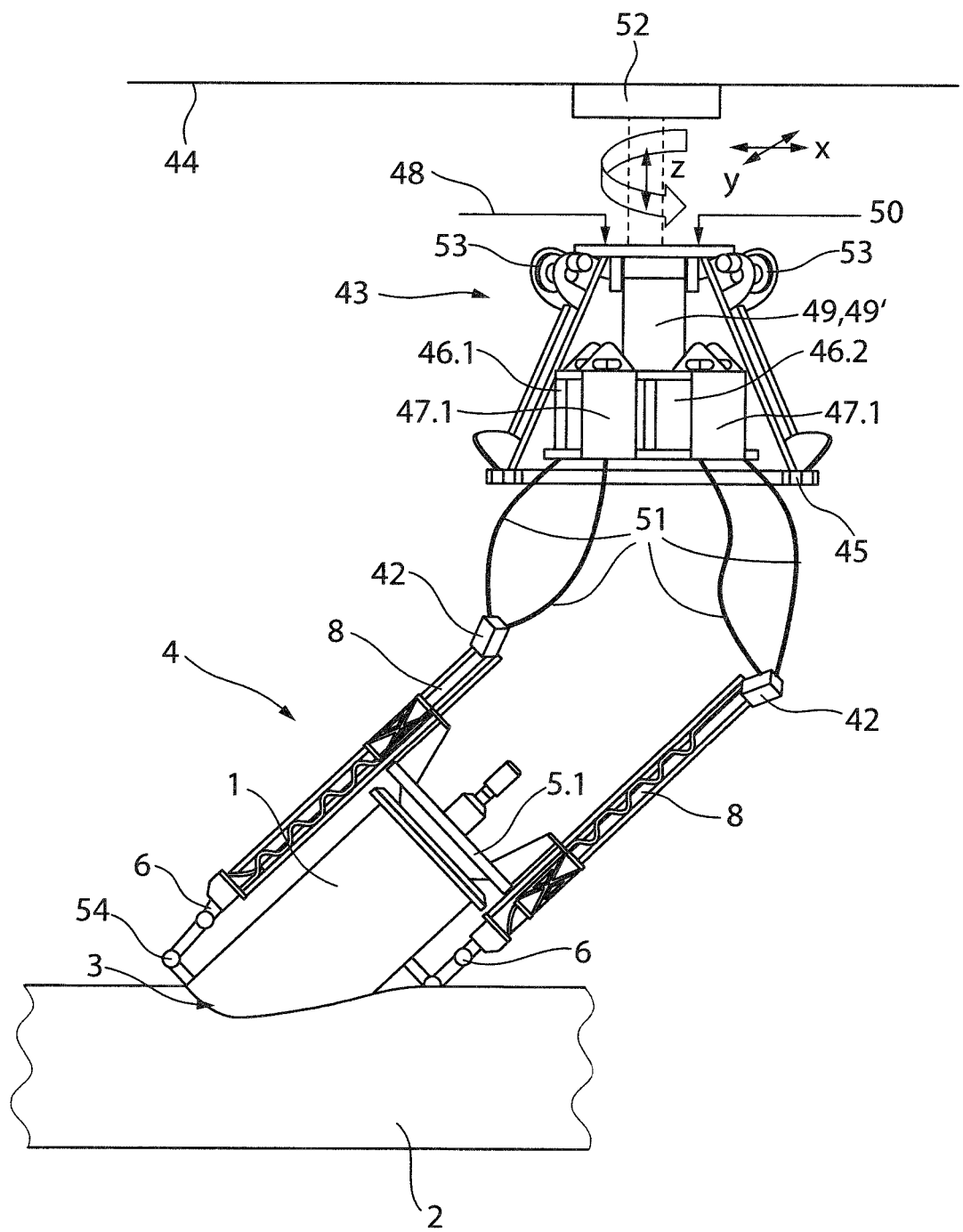
FIG. 8 shows the welding assembly with a supply module mounted on a support structure.

For this purpose, a unit that is preferably constructed separately from welding assembly 4 in the form of a supply module 43 is needed. Welding assembly 4 and supply module 43 are illustrated diagrammatically in FIG. 8, in which welding assembly 4 is secured frontally to a tube connector 1. The tube longitudinal axis is secured at an incline at an angle of 45° relative to the tube longitudinal axis of a base tube. Welding assembly 4 is equipped with two welding tools 6 mounted on carrier ring module 5.1. Each too is mounted facing the three-dimensional intersection curve 3 on the end of the linearly displaceable linear frames 8 which are attached in articulated manner to carrier ring module 5.1.

Welding tools 6 are supplied with electrical energy particularly with materials needed for the welding process, such as welding wire and process gas via the separately constructed supply module 43, which is connected to be articulated and largely freely positionable in space to a separate support structure 44. The suspension system 52 for suspending supply module 43 on support structure 44 enables both vertical (z-axis) and horizontal (x, y axes) positioning as well as rotation of the supply module 43 about the vertical axis (z-axis).

Supply module 43 has a module support 45, on which all logistical components important for the welding process are accommodated. These components include a control unit 46.1 and 46.2 for each welding tool and a storage space for welding wire with corresponding motorized wire feed 47.1, 47.2. Energy is supplied to the separate supply module, particularly to control units 46.1 and 46.2 preferably via an external cable feed 48, which is coupled via a slip ring assembly 49 arranged centrally on supply module 43. If necessary, a further external feed line 50 may be provided, via which process gas may be supplied to the supply module 43. Process gas feed 50 is also connected to supply module 43 via a fluid-tight slip ring assembly 49'. In this way, external energy sources as well as gas reservoirs—in the form of gas bottles for example—may be kept in easily accessible locations close to the tube joint and used as needed.

Correspondingly flexible connector lines 51 are provided between the supply module 43 and the supply units 42, via which ultimately the welding tools are supplied with energy and also with the materials essential for the welding process.

The arrangement provided by carrier ring module 5.1 whereby welding tools 6 are mounted rotatably about the tube longitudinal axis of tube connector 1 permits supply module 43 to be rotated about the tube longitudinal axis according to the same path as the rotating movement of welding tool 6 which ensures that the connector lines 51 do not become twisted and suffer damage. For this purpose, module support 45 of supply module 43 is suspended so as to be spatially freely positionable and particularly mounted rotatably about vertical axis z suitably on support structure 44. The support 45 is designed for example in the form of a boom or as a tripod or four-legged structure, and extends above welding assembly 4 together with the tube connectors to be joined.

Additionally, by virtue of the stable, load supporting module support 45, the supply module 43 further functions as a crane element to which welding assembly 4 may be detached and attached securely as a complete assembly. With the aid of the motorized deflection rollers 53 mounted on module support 45, around which the cable pulls pass, welding assembly 4 can be lowered for installation and raised for deinstallation.

With the modular design of the welding assembly according to the invention, it is possible to weld tube joint constructions having differing dimensions. Thus it is possible to replace system subassemblies of the welding assembly with others of dimensions suitable for the current welding task, and to combine them with other groups. For example, differently sized carrier ring modules 5.1 as well as differently sized clamping modules 5.2 may be provided and combined with each other. Linear frames 8 of different lengths may also be inserted in retaining device 9. It is even possible to provide manipulator units 7 of differing sizes and strengths, which may then precisely position a specifically selected welding tool 6 appropriately to carry out the given welding task.

With the welding assembly described, it is thus possible to weld tube connectors of any diameter and with any angle between the base tube and the tube connector. The problem of a collision between the welding manipulator and the connector is minimal or non-existent. The novel welding assembly is significantly less expensive than gantry-based, necessarily fixed position welding systems, and is also easily scalable with regard to processing time due to the modular design. Thus for example, two, three or more welding tools may be secured to the carrier ring module via the respective linear frames, so that the necessary welding time can be reduced significantly. Another substantial advantage is the compact construction of the welding assembly. Whereas gantry-based welding assemblies are fixed in a single processing location, the welding assembly according to the invention can be brought to the tube joint and the joint can be welded on site.

REFERENCE LIST

1 First tubular component, tube connector
2 Second component, base tube
3 Three-dimensional intersection curve
4 Welding assembly
5 Securing assembly
5.1 Carrier ring module
5.2 Clamping module
6 Welding tool
7 Manipulator unit
8 Linear frame
9 Retaining device
10 Friction element
11 Guide rollers
12 Support platform
13 Underside of the support platform
14 Cushioning element
15 Insulating element
16 bearing plane
17 Spacer
18 Supporting struts
19 Connector plate
20 Friction element assembly
21 Guide rail
22 Carriage
23 Coupling link
23H Sleeve
23B1 Bolt with eye
23B2 Bolt with eye
24 Spindle nut
25 Spindle
26 Drive motor
27 Motor plate
27' Holding frame
27" Ball bushing
28 Guide rods
29 base plate
30 Mechanical energy storage device, plate spring assembly
31 Ring segment
32 Servomotor
32' Drive wheel
33 Strut structure
34.1 and 34.2 Carrier ring
5 Contact section
6 Longitudinal struts
7 Truss structure
8 Actuator
9 spindle
39' spindle nut
40 Half-open ball bushing
41 Supply line
42 Supply unit
43 Supply module
44 Support structure
45 Module support
46.1 and 46.2 Control unit
47.1 and 47.2 Reservoir, welding wire feed
48 External cable feed
49 Slip ring assembly
40 Process gas feed
41 Connector lines
42 Suspension system
43 Deflection roller
44 Sensor unit
W Roller bearing
1$i$ Tube inner wall
1R Tube longitudinal axis
D Axis of rotation
RD Tube connector diameter

The invention claimed is:

1. A welding assembly for permanent joining of a first tubular component with a second component along a two or three-dimensional intersection curve, along which the components contact, comprising:
a securing assembly for detachably securely joining a tubular end of the first component facing away from the intersection curve to a manipulator unit which is attached to the securing assembly to pivot about a longitudinal axis of the first component, the manipulator unit having a freely positionable manipulator end, and a welding tool attached to the freely positionable manipulator end, the securing assembly comprising a clamping module which is at least partially introducible into the tubular end of the first component on an end side in an axial manner, the clamping module being detachably securely joined onto a tube inner wall of the first tubular component, and to a carrier ring module which is rotatably attached to the clamping module, the carrier ring module axially extending beyond the tubular end of the first component when joined to the clamping module, and which is operatively coupled to a servomotor for the rotary driving of the carrier ring module about a tube longitudinal axis so that the carrier ring module is rotatable continuously about the tube longitudinal axis, and at least one linear frame attached to the carrier ring module, which is mounted to be movable bidirectionally and parallel to the tube longitudinal axis by an actuator, wherein the manipulator is a 6-axis open kinematic chain having a vertically articulated robot and is attached to one end of the frame; and a supply module on which is attached at least one of a control unit, an electrical energy supply unit, and at least one reservoir for material relating to a welding process and the material comprising welding wire and process gas;

the at least one component is connected to the welding tool via a connection line;

the supply module is rotatably mounted for performing a rotational movement when the movement from the welding tool occurs about the tube longitudinal axis, which permits rotations of the welding tool about the tube longitudinal axis; and the supply module is connected so to be positionable along at least one plane or the supply module is connected to the carrier ring module in a rotatably fixed manner.

2. The welding assembly according to claim 1, wherein the clamping module includes a support platform for bearing on an axially frontal tubular end of the first component along a bearing plane of the support platform.

3. The welding assembly according to claim 1, wherein at least three friction element assemblies are arranged on the support platform, each being movable at least radially with respect to an axis orientated orthogonally to the bearing plane which coincides with the longitudinal axis of the first component when the clamping module is joined to the inner wall of the tube, and which are spaced equidistantly around the axis, and which are moveable by an actuator from a first position, in which the friction element assemblies are each located a first radial distance from the axis, to a second position, in which the friction element assemblies are each located at second distance from the axis which is greater than the first distance, so that the friction element assemblies each form either a non-positive or a frictional locking connection with the tube inner wall.

4. The welding assembly according to claim 2, wherein the support platform includes an underside which can be turned to face the first component, and on which at least three cushioning elements are located equidistantly about the axis, with each element having a radial extension along at least sections to which an electrically insulating element is attached; and the electrically insulating elements stretch the bearing plane.

5. The welding assembly according to claim 3, wherein the support platform includes an underside which is turnable to face the first component, and on which at least three cushioning elements are located equidistantly about the axis, each element having a radial extension along at least sections to which an electrically insulating element is attached; and the electrically insulating elements stretch the bearing plane.

6. The welding assembly according to claim 3, wherein the at least three friction element assemblies each have a linear guide rail attached to the support platform, along which rail at least one carriage having a friction element that can be brought into engagement with tube inner wall is mounted to be displaceable bidirectionally; and at least one carriage is in operative connection via a coupling link with an actuator that is braced on the support platform.

7. The welding assembly according to claim 4, wherein the at least three friction element assemblies each have a linear guide rail attached to the support platform, along which rail at least one carriage having a friction element that can be brought into engagement with tube inner wall is mounted to be displaceable bidirectionally; and at least one carriage is in operative connection via a coupling link with an actuator that is braced on the support platform.

8. The welding assembly according to claim 6, wherein the guide rails are orientated towards the support platform radially to the axis and are arranged to be inclined with respect to the bearing plane so that when the clamping module is joined both a radially acting retaining force fixing the clamping module axially and an axially acting tensile force pulling the clamping module towards the first component are acting between the friction elements and the tube inner wall.

9. The welding assembly according to claim 6, wherein the guide rails are orientated towards the support platform radially to the axis and are arranged to be inclined with respect to the bearing plane so that when the clamping module is joined both a radially acting retaining force fixing the clamping module axially and an axially acting tensile force pulling the clamping module towards the first component are acting between the friction elements and the tube inner wall.

10. The welding assembly according to claim 8, wherein the guide rails are each inclined at an angle $\alpha$ relative to the bearing plane, wherein $0°<\alpha<10°$.

11. The welding assembly according to any one of claim 6, wherein the common actuator is a linear actuator having an actuation direction orientated along the axis and along which a bidirectionally displaceable control element is located, which is in operative connection with the coupling link of each friction element assembly.

12. The welding assembly according to claim 8, wherein a mechanical energy storage unit is connected with the linear actuator along the effective actuator direction, and exerts at least a force acting as a tensile force pulling the clamping module axially towards the first component.

13. The welding assembly according to claim 11, wherein the linear actuator includes a drive motor which is operatively connected with the support platform via the mechanical energy storage unit; and the drive motor is connected to a spindle orientated along the axis that is in engagement with a spindle nut, which is connected to the coupling links of the at least three friction element assemblies.

14. The welding assembly according to claim 13, wherein the mechanical energy storage unit is a spring assembly disposed between the drive motor and the support platform, and the drive motor is mounted to be axially movable relative to the support platform, so that when the clamping module is joined, the spring assembly exerts a tensioning force in a direction along which the actuator applies a force.

15. The welding assembly according to claim 14, comprising:
frame structure which protrudes axially beyond the clamping module and is displaced on the support platform, and at least three guide rollers are attached to the end of the frame structure opposite the support platform, and support introduction of the clamping module into the first tubular component.

16. The welding assembly according to claim 2, wherein the carrier ring module has at least one carrier ring which is connected to the support platform and is not rotatable about the axis, and on an inner ring side an inner ring is rotatable relative to the carrier ring and engages with the servomotor.

17. The welding assembly according to claim 1, wherein the at least one linear frame is attached radially outwardly from the carrier ring module and is rotatable together with the carrier ring module about the longitudinal axis of the tube.

18. The welding assembly according to claim 1, wherein a sensor is disposed on a freely positionable end of the manipulator unit for contactless detection of shape or size of an intermediate space or recess along the intersection curve to be filled by welding.

19. The welding assembly according to claim 1, wherein the supply module is connected to the separate support structure via a suspension system permitting vertical and horizontal positioning and rotation of the supply module about the vertical axis.

20. The welding assembly according to claim 1, comprising:
a slip ring coupling the supply module to the welding assembly to assure supply of energy, and an external cable feed is coupled thereto.

21. The welding assembly according to claim 20, wherein the slip ring coupling is fluid light and provided on the supply module, and an external process gas feed is coupled thereto.

* * * * *